Feb. 18, 1958 R. F. HARRINGTON 2,823,967
BEARING
Filed Nov. 29, 1954
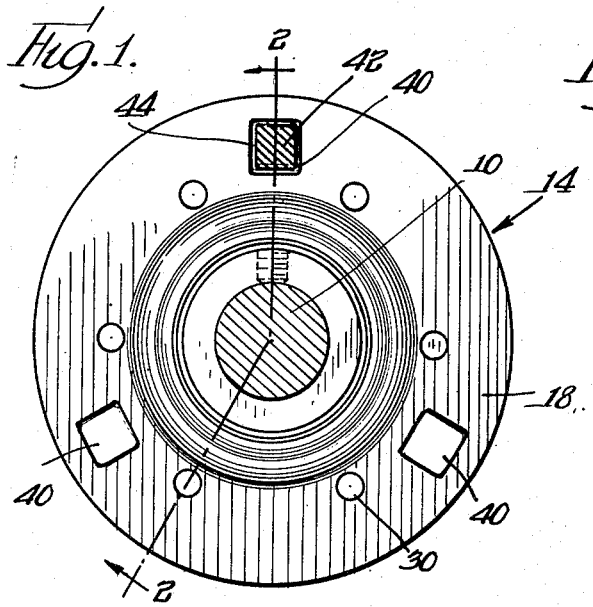
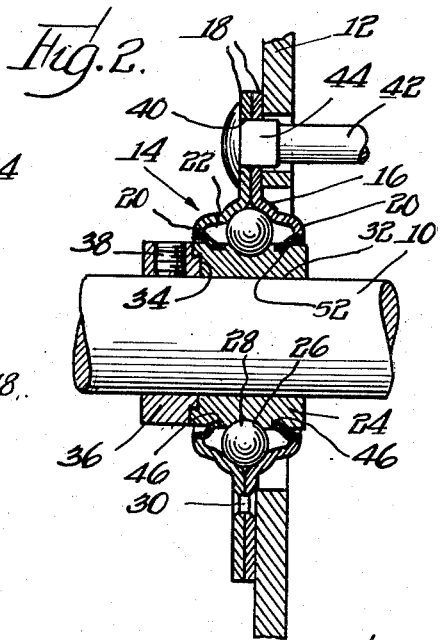
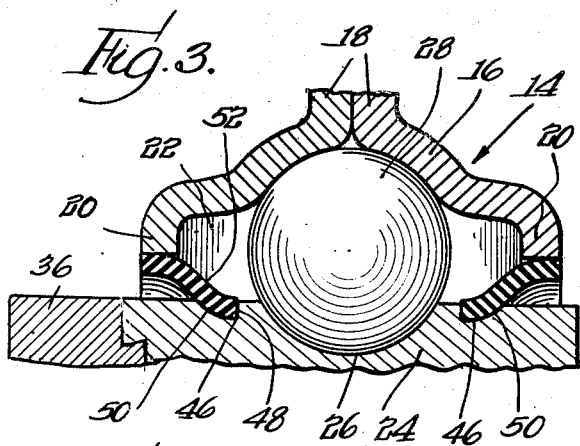
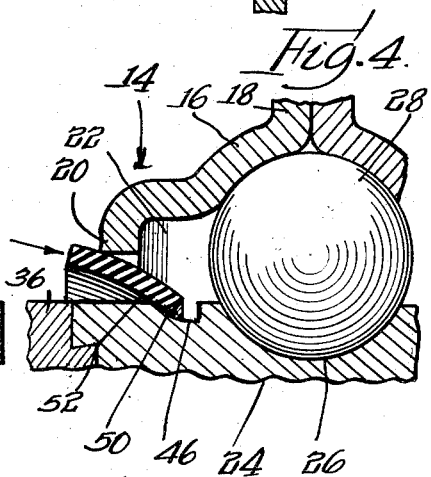
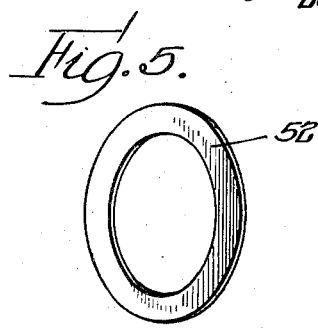
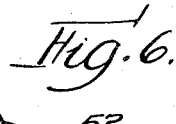
INVENTOR.
Richard F. Harrington
BY: Olson & Trexler
Attys.

United States Patent Office 2,823,967
Patented Feb. 18, 1958

2,823,967

BEARING

Richard F. Harrington, Davenport, Iowa, assignor to Parkersburg-Aetna Corporation, Chicago, Ill., a corporation of West Virginia Application November 29, 1954, Serial No. 471,629

12 Claims. (Cl. 308—187.2)

This invention is concerned generally with bearings, and more particularly with a bearing seal.

Various types of bearings are used for journaling rotating shafts in fixed supports. Sleeve bearings may be used in some instances, and roller bearings or ball bearings preferably are used when it is desirable to maintain friction at a minimum. Regardless of the type of bearing used, it is necessary to lubricate the bearing, and to prevent foreign matter such as dirt or any other abrasive or wear-inducing substances from entering into the bearing. Accordingly, it is common practice in many installations to provide bearing seals that are intended to retain lubricant in the bearing and to exclude dirt and the like.

Prior bearing seals often have been of rather complicated construction, and have complicated assembly of the bearings. They have been difficult to replace when worn and often have required disassembly of the bearing for re-lubrication.

Accordingly, it is an object of this invention to provide a bearing seal of extremely simple construction.

It is a further object of this invention to provide a bearing seal which can be assembled with the bearing after the bearing has been completely assembled and lubricated.

Yet another object of this invention is to provide a bearing seal as contemplated by the foregoing objects wherein only the seal need be assembled with the bearing after lubrication, i. e. no seal retainer is necessary.

A further object of this invention is to provide an improved bearing seal which operates satisfactorily even under conditions of misalignment.

A further object of this invention is to provide a bearing seal which facilitates re-lubrication of the bearing.

Yet another object of this invention is to provide a bearing seal which is easy to replace when worn.

Still another object of this invention is to provide a bearing seal wherein foreign matter tending to enter the bearing pushes the seal more tightly into sealing position.

Other and further objects and advantages of the present invention will be apparent from the following description when taken in connection with the accompanying drawings wherein:

Fig. 1 is an end view of a bearing incorporating the principles of my invention;

Fig. 2 is a cross sectional view thereof taken along the line 2—2 in Fig. 1;

Fig. 3 is an enlarged fragment of a portion of Fig. 2;

Fig. 4 is a view generally similar to Fig. 3 and illustrating installation of the bearing seal;

Fig. 5 is a perspective view of the bearing seal before installation, and

Fig. 6 is a view of the bearing seal in perspective substantially as it appears when installed.

Referring now in greater particularity to the drawings, there will be seen a shaft 10 to be journaled in or supported from a plate 12. It is journaled or supported from this plate or bearing support by means of a bearing 14 forming the subject matter of my invention. The bearing preferably is a ball bearing, but it will be understood that the principles of my invention are applicable to bearings of other types. The bearing 14 comprises an outer race 16 formed by a pair of circular plates 18 of steel or the like and bearing a mirror image relation to one another. The plates 18 are flat adjacent the outer edges, and then diverge to form the outer race 16, the plates continuing outwardly past the outer race and having downturned flanges 20 providing a lubricant or grease reservoir 22.

The bearing 14 also includes an inner member 24 of solid construction. This inner member may be machined or otherwise formed from steel or the like, and is provided with an annular circumferential groove or race 26 in which the bearing balls 28 are seated. The balls may be free as shown, or they may be provided with a ball retainer to hold them in a predetermined arcuate arrangement. In any event, it will be apparent that the plates 18 providing the inner race 16 readily are assembly about the balls and the inner race and are held together by rivets 30 or the like passing through suitable aligned apertures in the plates.

The inner race 24 is provided with a central bore 32 in which the shaft 10 is disposed. The ends of the inner race extend out as far as the outer edges of the flanges 20, and one of the ends is provided with an internal shoulder as indicated at 34. A ring 36 having a complementary shoulder fits against the internal shoulder 34 and encircles the shaft 10, being fixed by an eccentric locking collar thereon, which collar is maintained in position by means such as a set screw 38. The ring thus prevents axial movement of the shaft 10 in opposite directions.

It will be observed that the plates 18 are provided with a plurality of arcuately spaced apertures 40, and that bolts 42 are passed through these openings, and through aligned openings in the plates or bearing supports 12 for supporting the outer race of the bearing. The openings or apertures 40 conveniently are non-circular in configuration so that the bolts 42 may be provided with complementary non-circular sections 44 beneath the heads of the bolts to facilitate mounting.

The inner members 24 are provided with grooves 46 spaced on opposite sides of the bearing groove 26. The grooves 46 preferably are provided at their inner edges with walls 48 forming right angles with the axis of the bearing, and also forming right angles with the bottom of the grooves 46. The outer walls of the grooves 46 are bevelled or tapered as may be seen at 50. The grooves function as bearing seal seats as will be brought out directly hereinafter, and hence from time to time hereafter will be referred to as bearing seal seats.

It will be apparent that the parts of the bearing heretofore described can be assembled and lubricant can be introduced to and around the balls 28 and into the chamber 22 in the absence of any bearing seal. After such assembly and lubrication, a bearing seal 52 is assembled therewith. The bearing seal comprises a flat ring or washer-like element cut from a section of rubber or the like. The material of the bearing seal is elastic or semi-elastic and is somewhat limp and flexible. It will be appreciated that preferably a synthetic rubber or elastomer is used instead of natural rubber due to the deterioration of natural rubber when exposed to most lubricants. The internal diameter of the bearing seal 52 is slightly less than the diameter of the seal seat 46, while the outer diameter is sufficient to allow the seal ring to flex over to the position shown in Fig. 3 with the outer edge of the ring being substantially co-incident with the outer edge of the adjacent flange 20. It will be appreciated that the inside diameter of the seal 52 is stretched somewhat as the seal is pushed into the seat 46, such installation being indicated in Fig. 4. Such stretching causes the ring to flex from its normal flat position into the generally concave-convex or flattened configuration illustrated in Figs. 3 and 6, the outer edge of the seal pushing lightly up against the corresponding flange 20. The seal is deformed to a generally sinuous shape and may approach the shape of a flattened S in which the free ends of the S are pulled away from one another horizontally and are simultaneously pulled in toward a common horizontal center line. Thus, the seal may be considered as somewhat reversely curved with concave and convex portions.

When the shaft 10, and accordingly the inner member of the ball-bearing, rotates, the bearing seals 52 will rotate therewith, due to the stretch fit. The centrifugal force throws the outer edge of each bearing seal out against the corresponding flange 20, tightly to seal against loss of lubricant, or entrance of foreign material. The outer edge of each seal normally bears rather lightly against the corresponding flange 20 under quiescent conditions. However, when the shaft 10 is rotating, this being the condition when there is the greatest tendency to lose lubricant, centrifugal force causes the outer edge of the seal to rub against the flange sufficiently tightly to provide an efficient seal against the loss of lubricant. This sealing by centrifugal force insures a continuous intimacy between the seal and sealing surface regardless of irregularities or misalignment of the seal and bearing surface.

After an extended period of use, the bearing may need additional lubricant. In this case, it is a simple matter to flex the outer edge of the seal away from the corresponding flange 20 with a sharp instrument for injecting lubricant past the seal. Also, the seal may itself in time become less efficient due to wear. In this case, the seal readily can be removed by means such as a tweezers, and a new ring then may be installed with the same facility as the original ring was installed. No parts other than the seal need be assembled with the seal and bearing upon installation of a seal. This not only reduces costs and simplifies installation and servicing of the seals, but also causes any foreign matter that may tend to move into the bearing to push the seal more tightly against its corresponding flange 20.

The specific example of my improved bearing and seal as heretofore shown and described will be understood as being illustrative only. Various changes in structure may occur to those skilled in the art, and such changes will be understood as forming a part of my invention in so far as they fall within the spirit and scope of the appended claims.

I claim:

1. A bearing construction comprising an outer member, an inner member co-axial with and rotatable relative to said outer member and spaced therefrom at least in part, and a seal ring interposed between said members for retaining lubricant and excluding foreign matter, said ring being of thin and readily flexible resilient material and normally being flat and being flexed into a generally S-shaped configuration solely by engagement with said members, the inherent resiliency of said ring tending to return it to its initial shape and thereby maintaining intimate sealing contact with said members.

2. A bearing construction comprising an outer bearing member, an inner bearing member co-axial with and rotatable relative to said outer bearing member, said bearing members being spaced apart, a plurality of roller elements being interposed between said bearing members, and a seal ring interposed between said members for retaining lubricant and excluding foreign material, said ring being of thin and readily flexible resilient material and normally being flat and being flexed into a substantially concave and convex configuration of generally S-shape solely by engagement with said members, the inherent resiliency of said ring tending to return it to its initial shape and thereby maintaining intimate sealing contact with said members.

3. A bearing construction comprising an outer member, an inner member co-axial with and rotatable relative to said outer member and spaced therefrom at least in part, and an elastic seal ring interposed between and engaging said members in the spaced apart part for retaining lubricant and excluding foreign matter, said ring being of thin and readily flexible resilient material, said ring normally being flat and having an internal diameter less than the diameter of the co-operating part of the inner member, said elastic ring when installed being stretched at its inner diameter and deflected by engagement with said members into a generally sinuous configuration, said ring being otherwise unconfined, the inherent resiliency of said ring tending to return it to its initial shape and thereby maintaining intimate sealing contact with said members.

4. A bearing construction as set forth in claim 3 wherein the sinuous configuration of the ring has a cross section substantially resembling a flattened S.

5. A bearing construction comprising an outer member, an inner member co-axial with and rotatable relative to said outer member and spaced therefrom at least in part, and an elastic seal ring interposed between said members in the spaced apart part for retaining lubricant and excluding foreign matter, said ring being of thin and readily flexible resilient material, said ring normally being flat and having an internal diameter less than the diameter of the cooperating part of the inner member, said inner member being provided with a seal seat in the form of an annular groove having a minimum diameter greater than the inner diameter of said bearing seal, said elastic ring when installed having its inner edge received in said annular groove and being stretched at its inner diameter and deflected into a generally flattened S configuration between said members, the inherent resiliency of said ring tending to return it to its initial shape and thereby maintaining intimate sealing contact with said members.

6. A bearing construction as set forth in claim 5 wherein the groove forming the seal seat is provided with a substantially right angle interior shoulder at the inner end of the seal ring and with a bevelled edge outwardly thereof toward the outer end of the seal ring.

7. A bearing construction comprising an outer member having an annular inwardly directed sealing edge, an inner member co-axial with and rotatable in said outer member and having a bearing seal receiving portion, the inner and outer members being spaced apart at least between said seal receiving portion and said sealing edge, and a seal ring received on the seal receiving portion of the inner member and having its outer edge substantially bearing against said sealing edge, said seal ring being of thin and readily flexible resilient material and normally being flat and being deflected to a generally flattened S configuration between said seal receiving portion and said sealing edge, said seal rotating with said inner member and the outer edge of said seal being centrifugally urged into continuous intimacy with said sealing edge to retain lubricant and exclude foreign matter.

8. A bearing construction as set forth in claim 7 wherein the seal ring is elastic and has a normal inner diameter less than the diameter of the seal receiving portion of said inner member.

9. A bearing construction comprising an outer member, an inner member co-axial with and rotatable relative to said outer member and spaced therefrom at least in part, and a seal ring interposed between and engaging said members in the spaced part for retaining lubricant and excluding foreign matter, said ring normally being flat and being flexed into position by and between said members so that the cross section of said seal ring assumes substantially the shape of a flattened S, said ring being flexed solely by engagement with said members and being otherwise free.

10. A bearing construction comprising an outer member, an inner member co-axial with and rotatable relative to said outer member and spaced therefrom at least in part, and a flexible seal ring interposed between and engaging said members in the spaced part for retaining lubricant and excluding foreign matter, said seal ring having an inner portion lying with one face against said inner member and having an outer portion with the opposite face lying against said outer member, and an offset intermediate portion, said ring in cross section thereby being substantially a flattened S-shape, said ring being flexed solely by engagement with said members and being otherwise free.

11. A bearing construction comprising an outer member having an outer race, an inner bearing member co-axial with and rotatable in said outer member and having an inner race, a plurality of roller elements rolling in said races and journaling the inner bearing member in the outer member, a groove in said inner member on each side of said race, said outer member having seal edges on opposite sides of the outer race and spaced axially outwardly of the grooves in the inner member, and an elastic seal ring of thin and readily flexible resilient material seated in each said groove, said seal rings normally being flat and having inside diameters less than the diameters of said grooves, said rings being stretched and deflected into a generally flattened S configuration with their outer edges centrifugally thrown against the sealing edges of said outer member, the inherent resiliency of said rings tending to return said rings to their initial shapes and thereby maintaining intimate sealing contact with said inner and outer members.

12. A bearing construction comprising an outer member, an inner member co-axial with and rotatable relative to said outer member and spaced therefrom at least in part, and an elastic seal ring interposed between said members in the spaced apart part for retaining lubricant and excluding foreign matter, said ring being of thin and readily flexible resilient material, said ring normally being flat and having an internal diameter less than the diameter of the cooperating part of the inner member, said elastic ring when installed being stretched at its inner diameter and deflected into a generally sinuous configuration between said members, said inner member having a shoulder against which said ring seats to prevent creep of said ring, the inherent resiliency of said ring tending to return it to its initial shape and thereby maintaining intimate sealing contact with said members.

References Cited in the file of this patent

UNITED STATES PATENTS

| | | |
|---|---|---|
| 2,310,607 | Batesole | Feb. 9, 1943 |
| 2,467,099 | Smith | Apr. 12, 1949 |
| 2,544,582 | Booth | Mar. 6, 1951 |
| 2,647,808 | Spurgeon | Aug. 4, 1953 |

FOREIGN PATENTS

| | | |
|---|---|---|
| 523,854 | Great Britain | July 24, 1940 |
| 962,374 | France | Dec. 5, 1949 |
| 1,056,187 | France | Oct. 21, 1953 |

(Corresponding Great Britain 706,876, Apr. 7, 1954)